US008298462B2

(12) United States Patent
Luk et al.

(10) Patent No.: US 8,298,462 B2
(45) Date of Patent: Oct. 30, 2012

(54) METHOD OF UNIAXIALLY EXPANDING A FLUOROPOLYMER PRODUCT

(75) Inventors: Michael Luk, Hopkins, MN (US); Jeff Sewell, Brooklyn Park, MN (US); Jason Hill, Brooklyn Park, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1087 days.

(21) Appl. No.: 11/026,158

(22) Filed: Dec. 30, 2004

(65) Prior Publication Data

US 2006/0145394 A1 Jul. 6, 2006

Related U.S. Application Data

(60) Provisional application No. 60/533,096, filed on Dec. 30, 2003.

(51) Int. Cl.
*B27J 5/00* (2006.01)
*B29C 55/00* (2006.01)
(52) U.S. Cl. .......... 264/127; 264/209.5; 264/210.7; 264/288.4
(58) Field of Classification Search .......... 264/288.4
See application file for complete search history.

(56) References Cited

U.S. PATENT DOCUMENTS

| | | | |
|---|---|---|---|
| 3,953,566 A | 4/1976 | Gore | 264/505 |
| 3,962,153 A | 6/1976 | Gore | 521/79 |
| 4,110,392 A * | 8/1978 | Yamazaki | 264/127 |
| 4,321,711 A | 3/1982 | Mano | 623/1.43 |
| 4,647,416 A * | 3/1987 | Seiler et al. | 264/118 |
| 4,743,480 A | 5/1988 | Campbell et al. | 428/36.5 |
| 4,816,339 A | 3/1989 | Tu et al. | 428/421 |
| 4,955,899 A | 9/1990 | Della Corna et al. | 623/1.46 |
| 4,973,609 A | 11/1990 | Browne | 521/81 |
| 5,026,513 A | 6/1991 | House et al. | 264/127 |
| 5,026,591 A | 6/1991 | Henn et al. | 428/198 |
| 5,061,276 A | 10/1991 | Tu et al. | 623/1.33 |
| 5,071,609 A * | 12/1991 | Tu et al. | 264/119 |
| 5,110,527 A * | 5/1992 | Harada et al. | 264/127 |
| 5,152,782 A | 10/1992 | Kowligi et al. | 623/1.46 |
| 5,192,310 A | 3/1993 | Herweck et al. | 623/1.27 |
| 5,433,909 A | 7/1995 | Martakos et al. | 264/209.1 |
| 5,474,727 A | 12/1995 | Perez | |
| 5,476,589 A | 12/1995 | Bacino | 210/500.36 |
| 5,562,987 A * | 10/1996 | Shimizu | 428/364 |

(Continued)

FOREIGN PATENT DOCUMENTS

EP 0661336 7/1995

(Continued)

*Primary Examiner* — Jeffrey Wollschlager
(74) *Attorney, Agent, or Firm* — Vidas, Arrett & Steinkraus, P.A.

(57) ABSTRACT

This invention relates to a method of uniaxially expanding a fluoropolymer product including the steps of expanding a green fluoropolymer product in a first direction to create a first-expanded fluoropolymer product, and expanding the first-expanded fluoropolymer product in the same first direction. As a result with the subject invention, it has been found that ultra-high expansion and a variety of different porous/fibril structures can be achieved by using subsequent expansion steps in the same direction. Various considerations exist with such methodology, including the selection of rates of expansion of both steps, the amount of expansion of both steps, pre-heating and cutting the product between expansion steps. Although the present invention can be used with various fluoropolymer products, it is particularly well-suited for use with PTFE.

22 Claims, 8 Drawing Sheets

U.S. PATENT DOCUMENTS

| | | | |
|---|---|---|---|
| 5,607,478 A | 3/1997 | Lentz et al. | 623/23.69 |
| 5,620,763 A | 4/1997 | House et al. | 428/36.9 |
| 5,628,782 A | 5/1997 | Myers et al. | 623/2.25 |
| 5,665,114 A | 9/1997 | Weadock et al. | 623/134 |
| 5,749,880 A | 5/1998 | Banas et al. | 606/198 |
| 5,800,512 A | 9/1998 | Lentz et al. | 623/1.1 |
| 5,873,906 A | 2/1999 | Lau et al. | 128/898 |
| 5,928,279 A | 7/1999 | Shannon et al. | 623/1.13 |
| 6,001,125 A | 12/1999 | Golds et al. | 623/23.7 |
| 6,039,755 A | 3/2000 | Edwin et al. | 623/1.15 |
| 6,103,172 A | 8/2000 | Newman et al. | 264/288.8 |
| 6,207,091 B1 * | 3/2001 | Kanamoto et al. | 264/173.11 |
| 6,245,100 B1 | 6/2001 | Davila et al. | 623/1.13 |
| 6,296,661 B1 | 10/2001 | Davila et al. | 623/1.13 |
| 6,471,687 B2 | 10/2002 | Butler et al. | 604/891.1 |
| 6,517,571 B1 | 2/2003 | Brauker et al. | 623/1.13 |
| 2004/0024442 A1 | 2/2004 | Sowinski et al. | 623/1.13 |
| 2004/0049264 A1 | 3/2004 | Sowinski et al. | 623/1.28 |
| 2004/0122507 A1 | 6/2004 | Henderson | 623/1.27 |

FOREIGN PATENT DOCUMENTS

| | | |
|---|---|---|
| EP | 661336 A1 * | 7/1995 |
| WO | WO 93/00213 | 1/1993 |

* cited by examiner

METHOD OF UNIAXIALLY EXPANDING A FLUOROPOLYMER PRODUCT

CROSS-REFERENCE TO RELATED APPLICATION

This application claims priority of U.S. Provisional Appln. No. 60/533,096, filed Dec. 30, 2003, the entire contents of which are incorporated by reference herein.

FIELD OF THE INVENTION

This invention relates to methods of expanding fluoropolymer products and, more particularly, to methods of expanding polytetrafluoroethylene products.

BACKGROUND OF THE INVENTION

Figure 1:
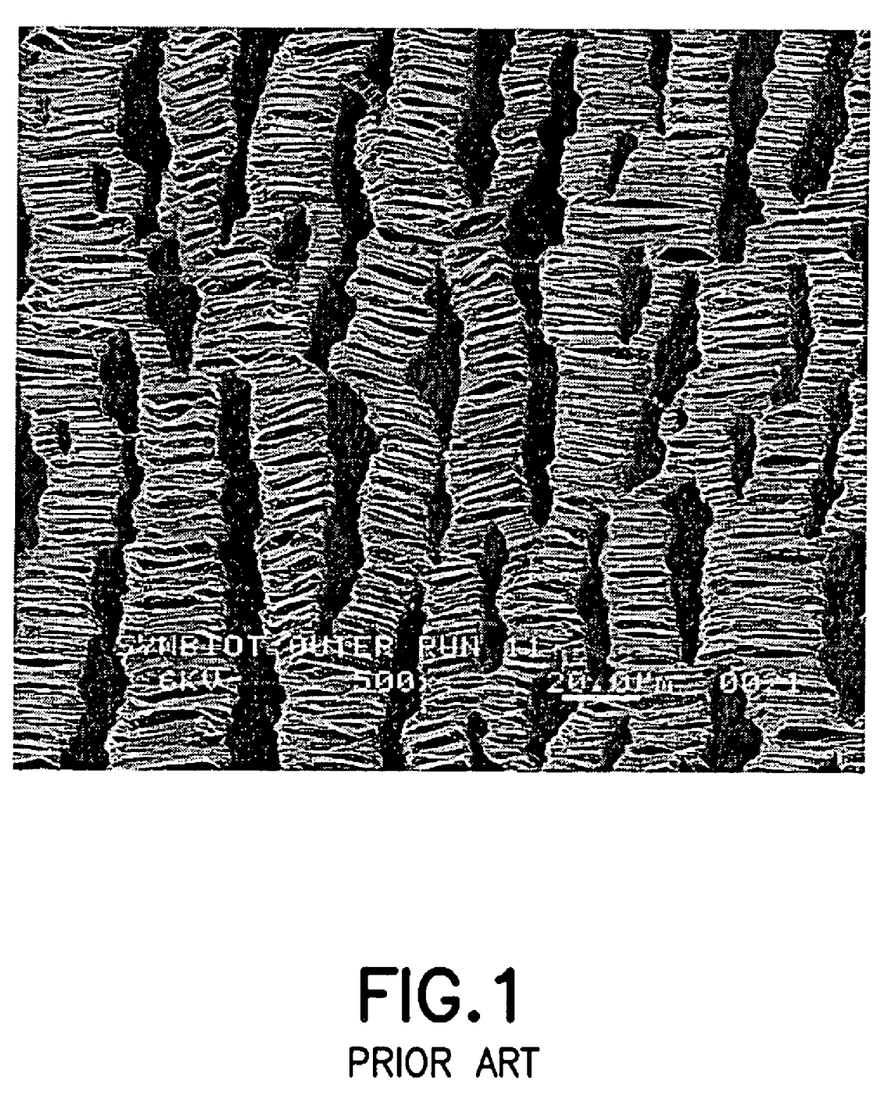
FIG. 1 is a micrograph of a typical uniaxially expanded PTFE structure.

Methods of forming fluoropolymer products are known in the art, including extruding polytetrafluoroethylene (PTFE) products. PTFE is commonly ram extruded after being treated with a lubricant and formed into a billet. With extrusion, a "green" PTFE product is formed. As is well known, the lubricant may be volatilized, and the "green" PTFE may be expanded into a fibrillated state (referred to as expanded PTFE or ePTFE) and, thereafter, heated above sintering temperature to coalesce the material into a stable state. FIG. 1 is a micrograph showing a typical fibrillated microstructure of uniaxially expanded PTFE. The elongated dark portions which generally extend in a top-to-bottom direction in the plane of FIG. 1 are nodes. Fibrils are thin hair-like structures which extend left-to-right in the plane of FIG. 1 and interconnect the nodes. As is typical with uniaxially expanded PTFE, the fibrils are disposed generally along the expansion direction.

Techniques have been developed in the prior art to expand PTFE in multiple steps, but along different axes. For example, it has been known to expand PTFE in a first longitudinal direction and then separately in a second perpendicular transverse direction to form biaxially expanded PTFE. U.S. Pat. No. 5,476,589, which issued on Dec. 19, 1995 to Bacino, discloses a method including in sequence: 1. transverse expansion of a PTFE tape; 2. two separate longitudinal expansions of the tape; 3. transverse expansion of the tape once again; and, 4. sintering of the final product.

Additionally, U.S. Pat. No. 5,749,880, which issued on May 12, 1998 to Banas et al. discloses longitudinally expanding PTFE tubes; encasing a stent within the tubes; sintering the tubes; and causing radial expansion of the assembly, which results in nodal deformation in the tubes. The previous multiple expansion techniques, however, have never dealt with obtaining ultra-high uniaxially expanded fluoropolymer, more particularly, ultra-high uniaxially expanded PTFE.

SUMMARY OF THE INVENTION

This invention relates to a method of uniaxially expanding a fluoropolymer product including the steps of expanding a green fluoropolymer product in a first direction to create a first-expanded fluoropolymer product, and expanding the first-expanded fluoropolymer product in the same first direction. As a result with the subject invention, it has been found that ultra-high expansion and a variety of different porous/fibril structures can be achieved by using subsequent expansion steps in the same direction. Various considerations exist with such methodology, including the selection of rates of expansion of both steps, the amount of expansion of both steps, pre-heating and cutting the product between expansion steps. Although the present invention can be used with various fluoropolymer products, it is particularly well-suited for use with PTFE.

As used herein, a "green" product is an unexpanded or essentially unexpanded product. A "green" product may include minimal expansion that occurs unintentionally such as, for example, during take-up from extrusion which may generate a tensive force in the product. In any regard, no intentional expansion has occurred to a "green" product.

This invention will be better understood through a study of the following detailed description and accompanying drawings.

BRIEF DESCRIPTION OF THE DRAWINGS

FIGS. 3($a$)-8($b$) are micrographs of various expanded PTFE structures formed in accordance with the subject invention. Each figure labeled as "a" is shown under a magnification of 100×, while the corresponding figure labeled "b" is the same structure as the "a" figure, but shown under a magnification of 500×.

DETAILED DESCRIPTION OF THE INVENTION

Figure 2:
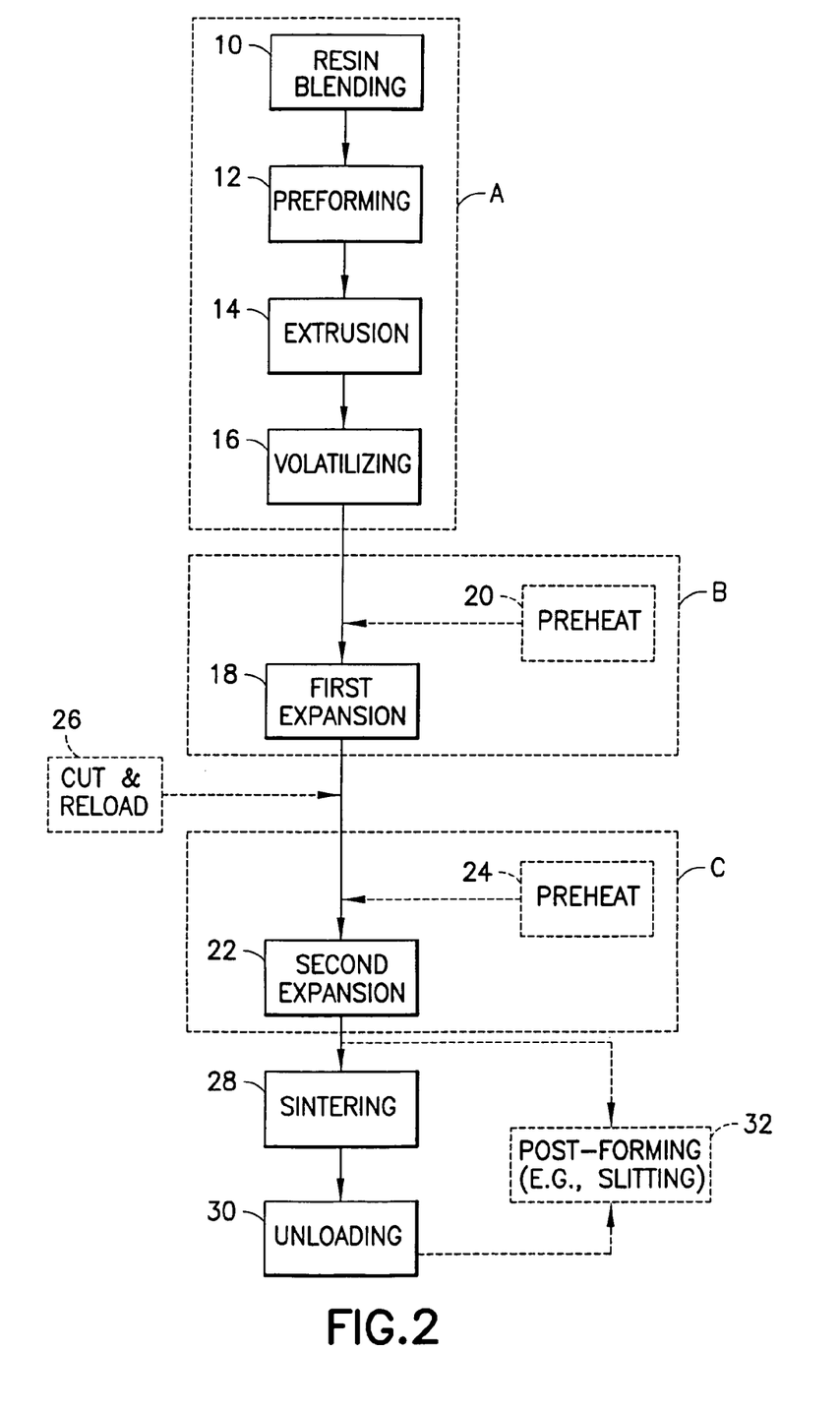
FIG. 2 is a flow chart of a process related to the subject invention.

The invention provides a process of uniaxially expanding a fluoropolymer product from a green state which includes subsequent steps of uniaxially expanding the fluoropolymer product. With reference to FIG. 2, a flow chart is provided setting forth process steps relating to the subject invention, including optional steps.

The discussion herein will be with reference to PTFE for illustrative purposes. It is to be understood that the process can be used with other fluoropolymers.

Box A of FIG. 2 represents an initial forming process. Any method of preparing green PTFE may be utilized. By way of non-limiting example, steps 10-16 are described to provide an exemplary process of preparing green PTFE. As is well known in the art, raw PTFE resin may be blended with a lubricant to aid in extrusion (step 10); the blended PTFE may then be preformed into a billet (step 12); and, the billet ram extruded into a desired shape, such as a tube or sheet (step 14). The lubricant may then be volatilized to remove the lubricant (step 16), thus providing "dry" green PTFE.

The green PTFE now is prepared for a first expansion step as represented by box B. More specifically, as represented by step 18, the green PTFE undergoes a first uniaxial expansion. It is preferred that the direction of expansion be coincident with the direction in which the PTFE product was formed or extruded. Although not required, it is further preferred that the green PTFE be heated prior to the first expansion as represented by step 20. Heating may be performed during other steps of the process, such as during the expansion of step 18. Expansion can be performed using any known technique, preferably using any known expansion oven.

The first-expanded PTFE product is then subjected to a second expansion step as represented by box C. Specifically, as set forth in step 22, the first-expanded PTFE product is expanded a second time uniaxially, in the same direction as the first expansion was performed in step 18. Again, although not required, it is preferred that preheating be performed prior to the second expansion (step 24). Heating may be continued during the expansion of step 22, or, alternatively the first-expanded PTFE product may only be heated during expansion. If heating during steps 18 and/or 20 cause to heat the PTFE first-expanded product to a greater temperature than that desired in steps 22 and/or 24, it is preferred that a sufficient cooling interval be provided before steps 22 and/or 24 to allow for effective preheating. With steps 22 and/or 24 calling for heating to a greater temperature than that used with any of the steps in box B, a time interval between the steps of box B and the steps of box C is optional.

Where there are equipment constraints or other constraints limiting the amount of expansion, the PTFE product may be cut in between expansion steps as represented by step 26. As such, after initial expansion and cutting, a cut segment of the first-expanded PTFE product resulting from step 18 may be utilized and subsequently expanded in step 22.

Although not shown, additional uniaxial expansion steps are possible. Once all uniaxial expansion has been completed, the product is sintered (step 28) and unloaded (step 30) from the expansion equipment, e.g. an expansion oven. As will be recognized by those skilled in the art, additional steps may be performed in the process. For example, the acted-upon PTFE may be internally pressurized during, before or between expansion steps 18 and/or 22 to promote radial expansion. Also, the PTFE product may be rotated during expansion (steps 18 and/or 22). Furthermore, the PTFE product may be heated at various stages of the process or heating may be continuous during all steps of the process (at the same or different temperatures). In addition, the PTFE product may be optionally subjected to various post-forming operations (step 32). For example, the PTFE product may be formed as a tube and slitted to form a sheet. The sheet may then be later acted upon, e.g., be uni-axially or multi-axially expanded. Sintering (step 28) may be performed before or after the post-forming operations.

Figure 3A:
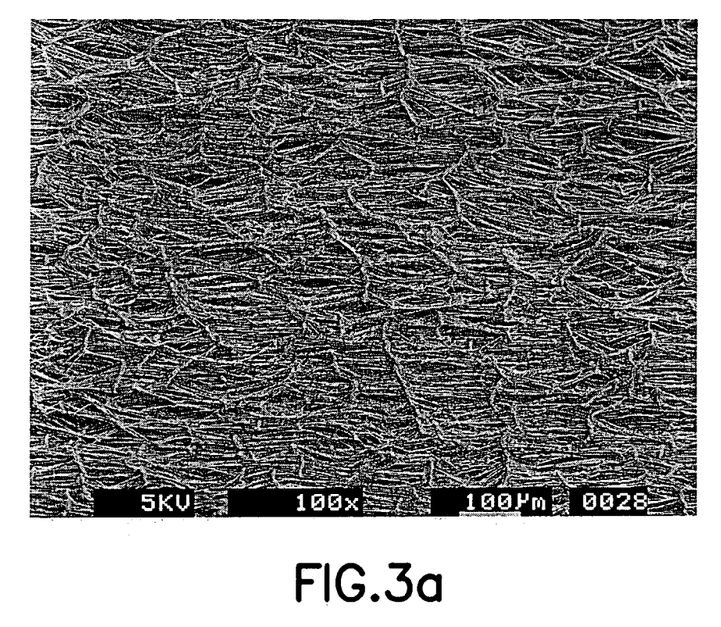
Figure 3B:
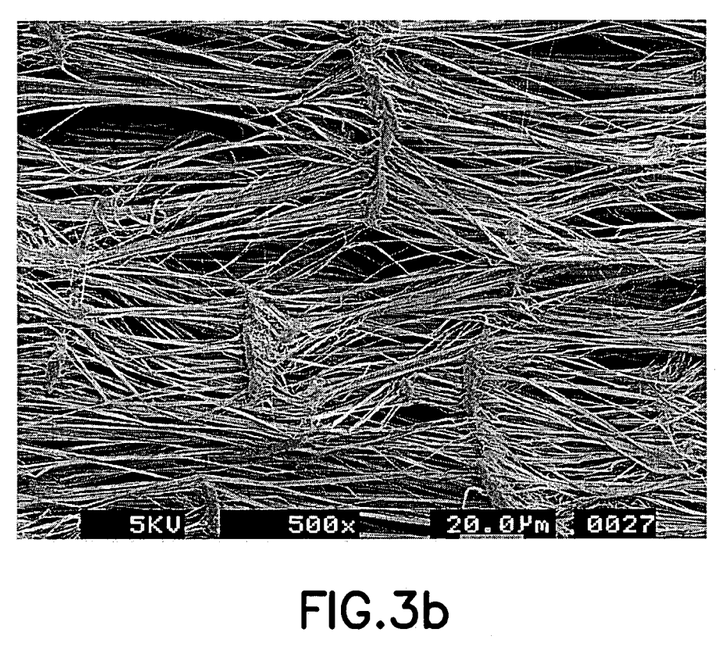
Figure 4A:
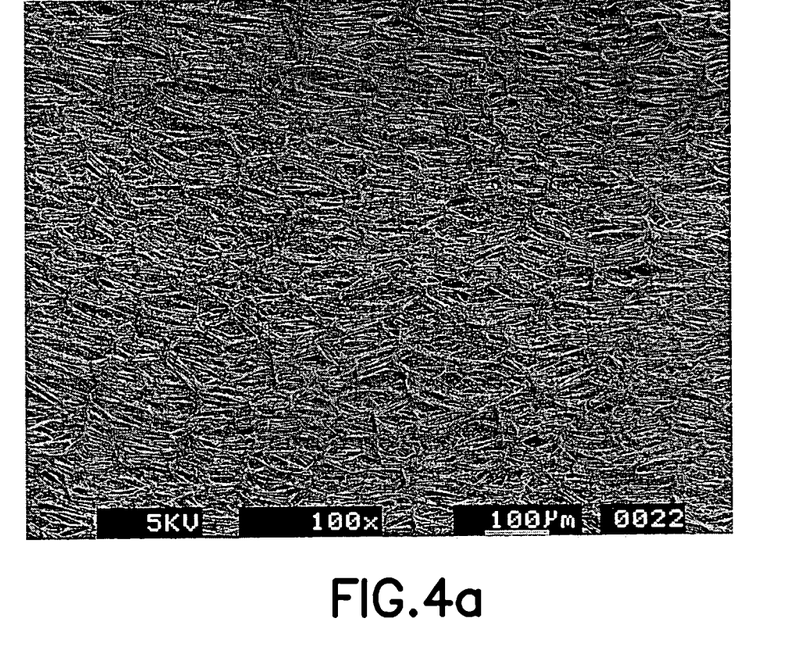
Figure 4B:
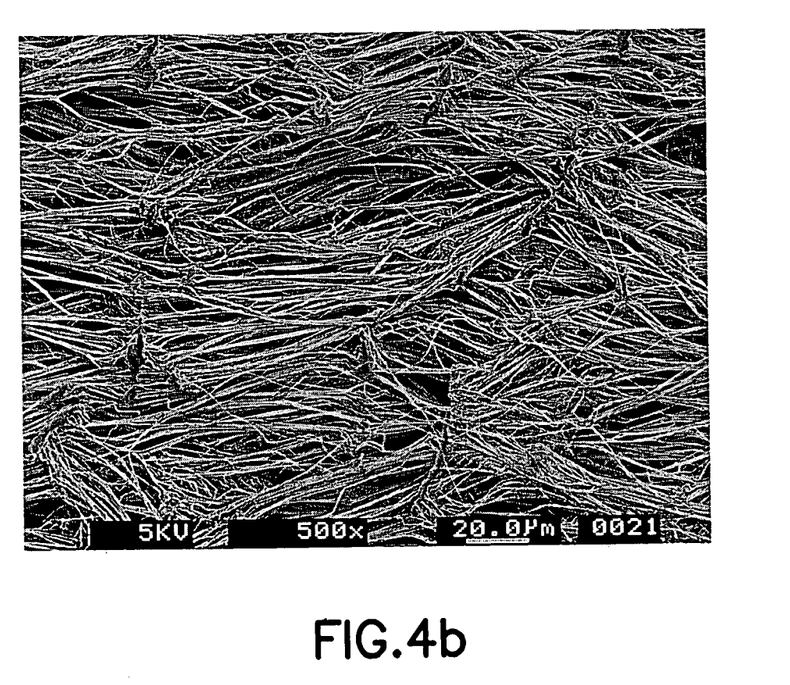
Figure 5A:
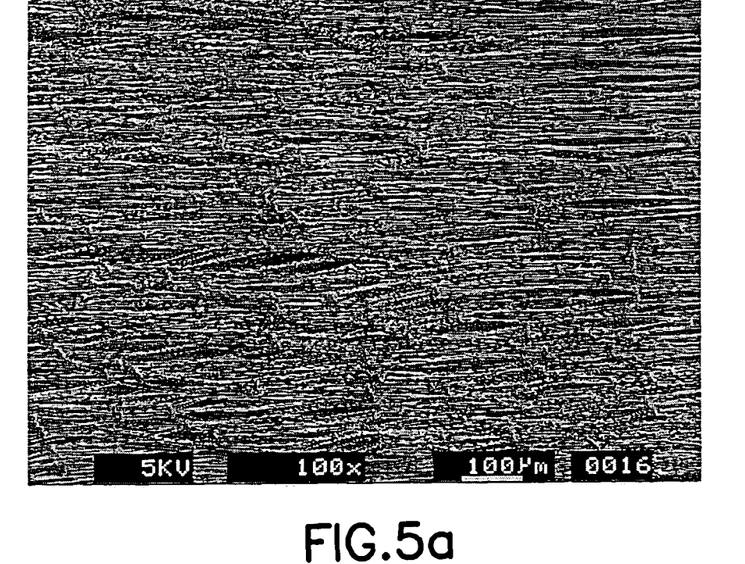
Figure 5B:
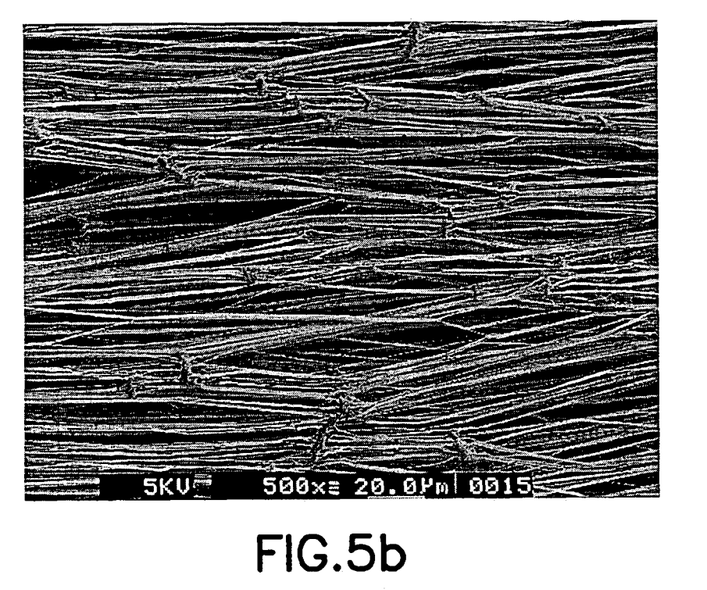
Figure 6A:
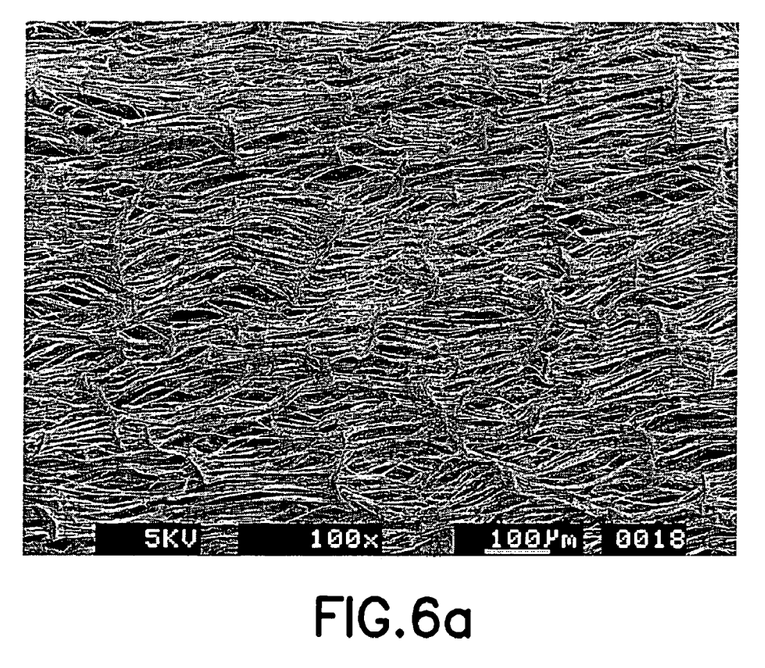
Figure 6B:
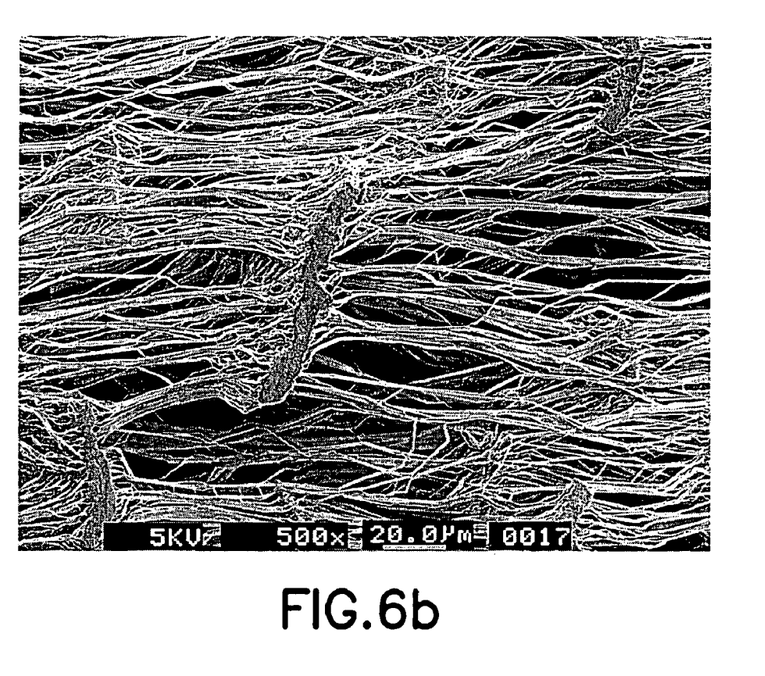
Figure 7A:
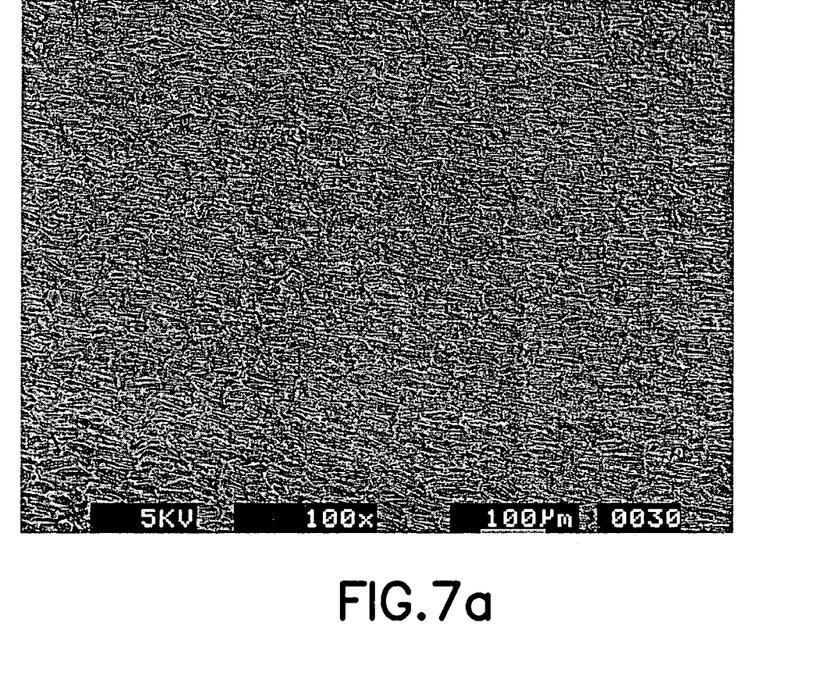
Figure 7B:
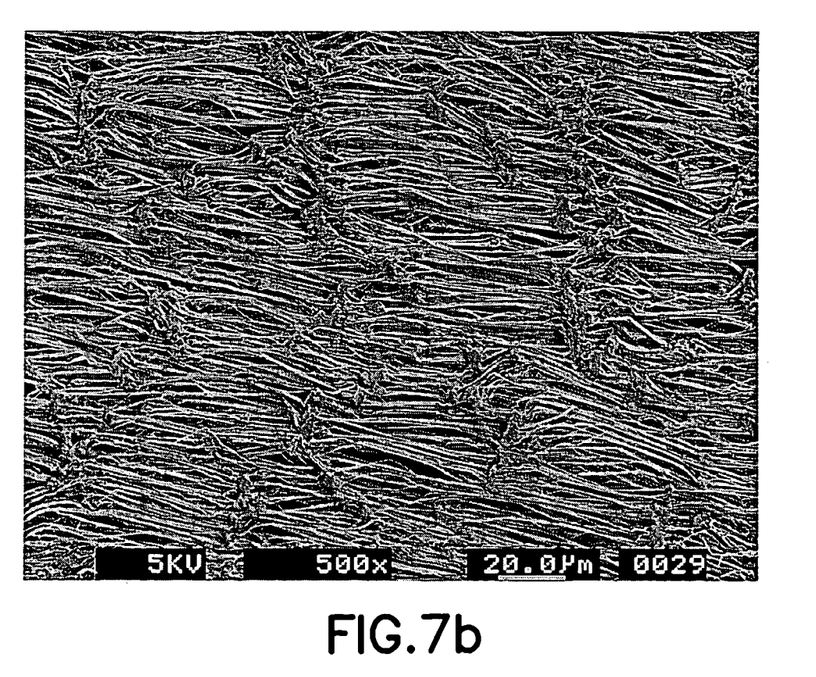

With the process described above, various fibrillated PTFE structures can be achieved depending on specific process parameters being utilized. With reference to FIGS. 3(*a*)-8(*b*), six different expanded PTFE structures achieved by the subject invention are shown ranging across a spectrum of node and fibril shapes and densities. (Each pair of similarly numbered figures shows the same structure—the figure labeled "a" is shown under a 100× magnification, while the figure labeled "b" is shown under a 500× magnification.) FIGS. 3(*a*) and (*b*) show a structure with relatively small nodes, large inter-nodal distances (IND) (the spacing between nodes) and branched fibrils. The structure of FIGS. 4(*a*) and (*b*) is similar to that of FIGS. 3(*a*) and (*b*), but with smaller nodes. FIGS. 5(*a*) and (*b*) show a structure with small nodes and large IND, however, the fibrils are generally axially aligned and not branched. FIGS. 6(*a*) and (*b*) show a structure with axially aligned fibrils and large IND; here, however, the nodes are larger in size. FIGS. 7(*a*)-(*b*) and 8(*a*)-(*b*) depict the densest structures with relatively small IND, small nodes and axially aligned fibrils. The structure of FIGS. 8(*a*) and (*b*) is the densest with the FIG. 7(*a*)-(*b*) structure having more porosity due to slightly longer fibril lengths (i.e., slightly larger IND). As will be appreciated by those skilled in the art, and as discussed below, various parameters in the process of the subject invention can be varied to obtain desired structural qualities, such as smaller or larger nodes, IND, fibril branching, and so forth.

The following table includes a listing of parameters that may be manipulated in the process of the subject invention to affect physical characteristics of the resulting structure:

TABLE 1

| Processing Variable | Effect of the Processing Variable |
| --- | --- |
| 1. Percentage of lubricant in raw PTFE resin used to make product | Percentage of lubricant may dictate the homogeneity of the PTFE product |
| 2. Green tube wall thickness | Wall thickness may limit the amount of achievable expansion |
| 3. Design of extruder cone on extruder | Different reduction ratios in raw extruding may effect how PTFE product is worked |
| 4. Percentage of lubricant remaining in green tube after volatilizing | Overly dried tube may become fragile and vulnerable to handling damage |
| 5. Preheating temperature before an expansion stage | Heat content of PTFE structure may affect mobility of molecular structure during expansion stage |
| 6. Preheating time interval before an expansion stage | Longer dwell time will allow PTFE to approach preheating temperature during an expansion stage |
| 7. Expansion percentage for an expansion stage | Higher expansion for a stage may lead to a more open structure (i.e., more porous structure) |
| 8. Expansion pull rate for an expansion stage | Different pull rates may cause different node and fibril structures and failure modes |
| 9. Stage expansion temperature | Heating during expansion may affect heat content of PTFE; stage expansion temperature may equal preheating temperature |
| 10. Post expansion stage dwell temperature | Most likely not desired, since exposure to heat between expansion stages may inadvertently cause unwanted sintering |
| 11. Post expansion stage heating time interval | Most likely not desired, since exposure to heat between expansion stages may inadvertently cause unwanted sintering |
| 12. Cooling time between expansion stages | To maximize heating effect of subsequent expansion stage, cooling below subsequent heating temperature may be desired |
| 13. Sintering between expansion stages | Low-level sintering may be utilized to adjust node and fibril patterns for subsequent expansion |

As will be recognized, Table 1 does not provide an exhaustive list of parameters that can be altered to affect the process of the subject invention. For example, the composition (e.g., the resin grade; manufacturer) of the raw PTFE resin itself may have an affect on obtainable PTFE structures.

Various tests were conducted utilizing the process of the subject invention. Examples 1-6 set forth below were all run utilizing extruded tubes with the subject invention and the following parameters:

Initial green tube wall thickness: 240 μm
Inner diameter of initial green tube: 6.32 mm
Standard deviation of initial green tube wall thickness: 9.3 μm
PTFE resin: ICI CD-123
Ram extruder: 0.248 mm mandrel and 137 reduction
Lubricant: Isopar G
Volatizing process: Green tubes dried at 125° F. for 120 minutes
Expansion oven: MM II oven Examples 1-6 were run with various expansion percentages, expansion pull rates, preheating temperatures and preheating time intervals. Tables 2 and 3 set forth properties of the resulting structures.

Example 1

PTFE green tube was subjected to two expansion stages, the first expansion stage percentage being 300% and the second expansion stage percentage being 1500% for a collective expansion of 6300%. The first expansion stage included a preheating at 580° F. for 4 minutes and was conducted at a rate of 35 cm/s, while the second expansion stage included a preheating at 350° F. for 4 minutes and was conducted at a rate of 1 cm/s. FIGS. 3(*a*) and (*b*) are micrographs taken from the outer surface of the resulting structure. The resulting structure has an IND of 80-100 μm and nodal lengths of approximately 40 μm.

Example 2

PTFE green tube was subjected to two expansion stages, the first expansion stage percentage being 620% and the second expansion stage percentage being 620% for a collective expansion of 5084%. The first expansion stage included a preheating at 350° F. for 20 minutes and was conducted at a rate of 35 cm/s, while the second expansion stage included a preheating at 580° F. for 4 minutes and was conducted at a rate of 1 cm/s. FIGS. 4(*a*) and (*b*) are micrographs taken from the outer surface of the resulting structure. The resulting structure has an IND of 80-100 μm and nodal lengths of less than 40 μm.

Example 3

PTFE green tube was subjected to two expansion stages, the first expansion stage percentage being 300% and the second expansion stage percentage being 1500% for a collective expansion of 6300%. The first expansion stage included a preheating at 350° F. for 4 minutes and was conducted at a rate of 35 cm/s, while the second expansion stage included a preheating at 580° F. for 20 minutes and was conducted at a rate of 1 cm/s. FIGS. 5(*a*) and (*b*) are micrographs taken from the outer surface of the resulting structure. The resulting structure has an IND of approximately 230 μm and nodal lengths of approximately 7.9 μm.

Example 4

PTFE green tube was subjected to two expansion stages, the first expansion stage percentage being 620% and the second expansion stage percentage being 620% for a collective expansion of 5084%. The first expansion stage included a preheating at 350° F. for 4 minutes and was conducted at a rate of 1 cm/s, while the second expansion stage included a preheating at 350° F. for 4 minutes and was conducted at a rate of 1 cm/s. FIGS. 6(*a*) and (*b*) are micrographs taken from the outer surface of the resulting structure. The resulting structure has an IND of approximately 60 μm and nodal lengths of approximately 80 μm.

Example 5

PTFE tube was subjected to two expansion stages, the first expansion stage percentage being 300% and the second expansion stage percentage being 1500% for a collective expansion of 6300%. The first expansion stage included a preheating at 350° F. for 20 minutes and was conducted at a rate of 35 cm/s, while the second expansion stage included a preheating at 350° F. for 4 minutes and was conducted at a rate of 35 cm/s. FIGS. 7(*a*) and (*b*) are micrographs taken from the outer surface of the resulting structure. The resulting structure has an IND of approximately 40 μm and nodal lengths of approximately 10 μm.

Example 6

Figure 8A:
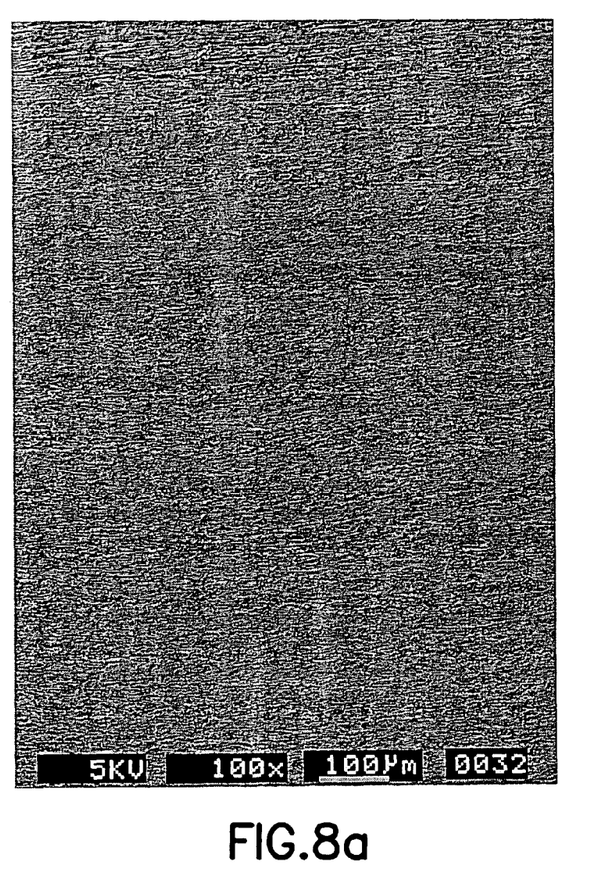
Figure 8B:
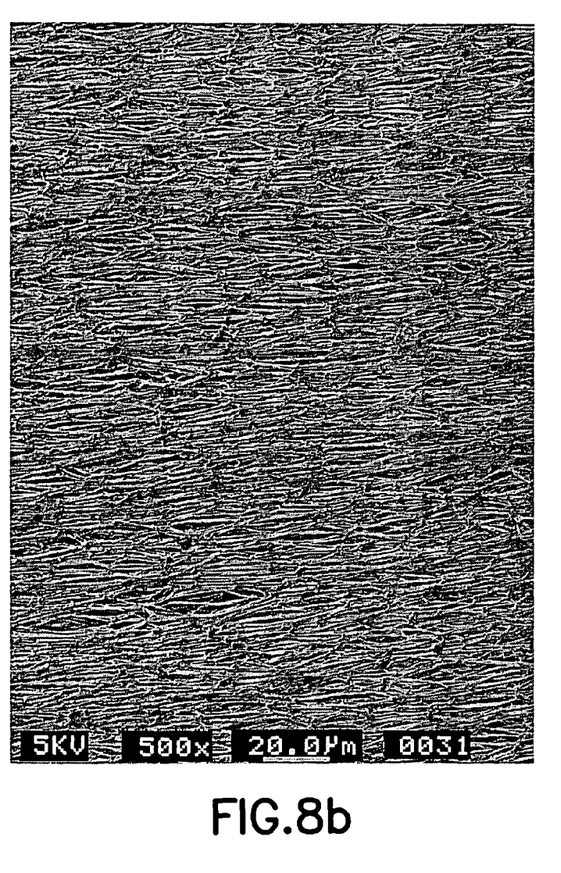

PTFE green tube was subjected to two expansion stages, the first expansion stage percentage being 300% and the second expansion stage percentage being 1500% for a collective expansion of 6300%. The first expansion stage included a preheating at 350° F. for 4 minutes and was conducted at a rate of 1 cm/s, while the second expansion stage included a preheating at 580° F. for 4 minutes and was conducted at a rate of 35 cm/s. FIGS. 8(*a*) and (*b*) and micrographs taken from the outer surface of the resulting structure. The resulting structure has an IND of approximately 15 μm and nodal lengths of approximately 3.9 μm.

TABLE 2

Average Axial Properties

| Example | Final Wall Thickness (micrometers) | Load at Peak (kg) | Stress at Peak (kg) | % Strain at Peak (%) | Stress at Break (kg/mm2) | % Strain at Break (%) | Toughness (kg/mm2) | Young's Modulus (kg/mm2) |
|---|---|---|---|---|---|---|---|---|
| 1 | 38.20 | 2.01 | 2.77 | 15.80 | 2.40 | 36.15 | 0.86 | 46.98 |
| 2 | 54.00 | 2.25 | 2.19 | 14.78 | 1.82 | 32.29 | 0.60 | 32.25 |
| 3 | 41.80 | 1.53 | 1.92 | 12.55 | 1.70 | 24.64 | 0.38 | 37.81 |
| 4 | 48.80 | 1.63 | 1.76 | 14.22 | 1.67 | 20.18 | 0.29 | 28.93 |
| 5 | 48.00 | 1.94 | 2.13 | 32.87 | 1.41 | 65.88 | 1.19 | 23.92 |
| 6 | 37.80 | 2.59 | 3.62 | 18.86 | 2.35 | 48.11 | 1.52 | 59.72 |

TABLE 3

Average Radial Properties

| Example | Wall Thickness (micrometers) | Load at Peak (g) | Stress at Peak (g/mm2) | % Strain at Peak (%) | Load at Break (g) | Stress at Break (g/mm2) | Strain at Break (%) | Toughness (g/mm2) | Young's Modulus (g/mm2) |
|---|---|---|---|---|---|---|---|---|---|
| 1 | 38.20 | 65.90 | 69.01 | 803.20 | 65.02 | 68.08 | 834.53 | 322.93 | 13.77 |
| 2 | 54.00 | 87.28 | 64.65 | 1127.00 | 86.72 | 64.24 | 1136.64 | 427.19 | 9.92 |
| 3 | 41.80 | 62.31 | 59.63 | 675.80 | 61.77 | 59.11 | 675.51 | 235.69 | 15.54 |
| 4 | 48.80 | 49.14 | 40.28 | 388.80 | 47.48 | 38.92 | 406.09 | 88.28 | 15.86 |
| 5 | 48.00 | 83.71 | 69.76 | 510.30 | 83.32 | 69.43 | 516.67 | 218.17 | 13.15 |
| 6 | 37.80 | 108.70 | 115.03 | 1200.00 | 108.07 | 114.36 | 1199.67 | 714.92 | 12.32 |

In reviewing the test results, it has been observed that changes in certain process parameters generally correlate to different final product characteristics. It has been found that the second expansion pull rate has the strongest correlative effect on the physical properties of the final expanded PTFE product. In particular, the radial strength and toughness of the final product is positively correlated to the second expansion pull rate, wherein the radial strength and axial toughness of a final PTFE product are greater where a higher second expansion pull rate is used with the inventive process. For example, with reference to Example 1 second expansion pull rate of 1 cm/s was used, resulting in an average radial load at peak of 65.90 g and an average axial toughness of 0.86 kg/mm$^2$, while in Example 5, a second expansion pull rate of 35 cm/s was used, resulting in an average radial load at peak of 83.71 g and an average axial toughness of 1.19 kg/mm$^2$. In addition, the IND of the final product correlatively decreases with (i.e., has a negative correlation to) an increase in second expansion pull rate. For example, in Example 1, the IND is 80-100 μm with a second expansion pull rate of 1 cm/s, while in Example 5, the IND is ~40 μm with a second expansion pull rate of 35 cm/s. The following is a table of identified process parameters along with product characteristics to which the identified parameters are positively or negatively correlated:

TABLE 4

| Process Parameter | Affected Final Product Characteristic |
| --- | --- |
| Second expansion pull rate | Positively correlated to radial strength and axial toughness |
| Second expansion pull rate | Negatively correlated to IND |
| First preheating time interval | Positively correlated to wall thickness |
| Second preheating time interval | Positively correlated to wall thickness |
| Difference between expansion stage percentages of first and second stages | Negatively correlated to wall thickness (e.g., larger difference between expansion stage percentages negatively correlates to a thicker wall) |

Likewise, it has been found that varying certain process parameters together may have an interacting effect on the physical properties of the final expanded product. For example, increasing the difference between expansion stage percentages of first and second expansion stages along with the first or second preheating time interval positively may correlate to increased wall thickness. Such interacting process parameters are listed in Table 5.

TABLE 5

| Process Parameters | Affected Final Product Characteristics |
| --- | --- |
| 1. Difference between expansion stage percentages of first and second expansion stages, and 2. first preheating time interval | Positively correlated to increased wall thickness |
| 1. Difference between expansion stage percentages of first and second expansion stages, and 2. second preheating time interval. | Positively correlated to increased wall thickness |
| 1. First expansion pull rate, and 2. first preheating time interval | Positively correlated to observable porosity of node and fibril structure (specifically, observable branching of fibrils) |
| 1. Difference between expansion stage percentages of first and second expansion stages, and 2. second preheating time interval | Positively correlated to observable porosity of node and fibril structure (specifically, fibril packing density) |

As is readily appreciated, various process parameters can be utilized, although certain ranges are preferred. With regards to overall expansion, it is desired to obtain an overall and final expansion of the PTFE product of 1,000%-10,000% collectively from the various expansion steps (i.e., the resulting PTFE structure had been expanded 1,000%-10,000% from its initial green state). It has been found, for example as indicated in Examples 1, 3, 5 and 6, that with performing the first expansion step (step 18) with a 300% expansion and the second expansion step (step 22) with a 1,500% expansion, a collective expansion of 6,300% can be achieved. Also, with performing the first expansion step (step 18) with a 620% expansion and the second expansion step (step 22) with a 620% expansion, as indicated in Examples 2 and 4, a collective expansion of 5,084% can be achieved. Each expansion step can expand a product an expansion percentage of 1%-800%. Advantageously, the collective expansion resulting from the various individual expansion steps can be significantly larger than the expansion provided by each of the individual stages. As will be appreciated by those skilled in the art, various combinations of expansions can be utilized.

As indicated above, the pull rates of expansions are critical factors in practicing the subject invention. Preferably, the pull rates of expansion of any of the expansion steps (steps 18 and 22) falls in the range of about 50 cm/s or less. The different expansion steps (steps 18 and 22) may be conducted at different rates, more preferably with the expansion rate of the first expansion step (step 18) being greater than the expansion rate of the second expansion step (step 22). The lower expansion rate of the second expansion step (step 22) allows for more uniform expansion than if the rate was not lowered from the first expansion step (step 18). By way of non-limiting example, the expansion rate of the first expansion step (step 18) can be about 35 cm/s with the expansion rate of the second expansion step (step 22) being about 1 cm/s. Also, the pull rates of expansion need not remain constant during an expansion step, but may be varied during an expansion step (e.g., from faster to slower, or vice versa).

With regards to heating, three primary factors are implicated: timing of heating; duration; and temperature. As indicated above, heating may occur at various points in the subject process, but is most preferred as preheating before expansion. Heating may occur for any duration, but it is preferred that the preheat steps (steps 20 and 24) each be conducted for between about 4 and 20 minutes prior to the corresponding expansion step. The most critical factor in determining duration of heating lies in the time needed to achieve a desired temperature. The longer a heating operation is conducted, the more likely it is that a desired temperature is achieved which can evenly affect the PTFE product. As for temperatures, it is also preferred that the preheat temperatures be maintained below the sintering temperature of the relevant material (e.g., 660° F. for PTFE) and, more preferably, that the preheat temperature of the first preheat step (step 20) be higher than the preheat temperature of the second preheat step (step 24). For example, with PTFE, the first preheat step may have a temperature of about 580° F., while the second preheat step (step 24) may have a temperature of about 350° F. Preheating can be conducted at any temperature, although using a temperature in the range of 350° F. to 580° F. generally avoids sintering effects. Some sintering may be desired to achieve a desired node and fibril structure and higher temperatures can be accordingly utilized. As for heating outside of the preheating steps (steps 20 and 24), the same criteria discussed above apply.

While the invention has been described in relation to the preferred embodiments with several examples, it will be understood by those skilled in the art that various changes may be made without deviating from the spirit and scope of the invention as defined in the appended claims.

What is claimed is:

1. A method of uniaxially expanding a fluoropolymer tube comprising the steps of:
    expanding a green fluoropolymer tube in a first direction at a first temperature of about 580° F. and a first expansion rate of about 50 cm/second or less to create a first-expanded fluoropolymer tube; and,
    expanding the first-expanded fluoropolymer tube in said first direction at a second temperature of about 350° F. and a second expansion rate, the second expansion rate is less than the first expansion rate;
    wherein the first-expanded fluoropolymer tube is cut into at least two pieces before the step of expanding the first-expanded fluoropolymer tube; and
    wherein the steps of expanding collectively result in expanding the green fluoropolymer tube in excess of 5000%.

2. A method as in claim 1, wherein said step of expanding the green fluoropolymer includes first expansion stage that comprises expanding the green fluoropolymer product by 300% wherein the steps of expanding collectively result in expanding the green fluoropolymer tube in excess of 5000%.

3. A method as in claim 2, wherein said step of expanding the first-expanded fluoropolymer includes a second expansion that that comprises expanding the first-expanded fluoropolymer product by 1500% wherein the steps of expanding collectively result in expanding the green fluoropolymer tube in excess of 5000%.

4. A method as claim 1, wherein said step of expanding the green fluoropolymer tube includes a first expansion stage that comprises expanding the green fluoropolymer product by 620% wherein the steps of expanding collectively result in expanding the green fluoropolymer tube in excess of 5000%.

5. A method as in claim 4, wherein said step of expanding the first-expanded fluoropolymer tube includes a second expansion stage that comprises expanding the first-expanded fluoropolymer product by 620% wherein the steps of expanding collectively result in expanding the green fluoropolymer tube in excess of 5000%.

6. A method as in claim 1, wherein said steps of expanding collectively result in expanding the green fluoropolymer tube in excess of 5,000% up to 10,000%.

7. A method as in claim 1, further comprising a step of heating the green fluoropolymer tube.

8. A method as in claim 7, wherein said step of heating the green fluoropolymer tube is conducted before the step of expanding the green fluoropolymer tube.

9. A method as in claim 8, wherein said step of heating the green fluoropolymer tube includes heating the green fluoropolymer tube at about 580° F.

10. A method as in claim 9, wherein said step of heating the green fluoropolymer tube includes heating the green fluoropolymer tube for a predetermined time in the range of about 4-20 minutes.

11. A method as in claim 8, wherein said step of heating the green fluoropolymer tube is conducted during the step of expanding the green fluoropolymer tube.

12. A method as in claim 7, wherein said step of heating the green fluoropolymer tube includes heating the green fluoropolymer tube at a temperature below the sintering temperature of the green fluoropolymer tube.

13. A method as in claim 1, further comprising a step of heating the first-expanded fluoropolymer tube.

14. A method as in claim 13, wherein said step of heating the first-expanded fluoropolymer tube is conducted before the step of expanding the first-expanded fluoropolymer tube.

15. A method as in claim 14, wherein said step of heating the first-expanded fluoropolymer tube includes heating the first-expanded fluoropolymer tube at about 350° F.

16. A method as in claim 15, wherein the step of heating the first-expanded fluoropolymer tube includes heating the first-expanded fluoropolymer tube for a predetermined time in the range of about 4-20 minutes.

17. A method as in claim 14, wherein said step of heating the first-expanded fluoropolymer tube is conducted during the step of expanding the first-expanded fluoropolymer tube.

18. A method as in claim 13, wherein said step of heating the first-expanded fluoropolymer tube includes heating the first-expanded fluoropolymer tube at a temperature below the sintering temperature of the first-expanded fluoropolymer tube.

19. A method as in claim 1, wherein said fluoropolymer is polytetrafluoroethylene.

20. A method as in claim 1, wherein said green fluoropolymer tube is unsintered.

21. A method as in claim 20, wherein said first-expanded fluoropolymer tube is unsintered.

22. A method as in claim 1, wherein said first expansion rate is about 35 cm/s and said second expansion rate is about 1 cm/s or less.

* * * * *